2,870,048
DEENAMELING PROCESS

Clarence Woerther, Evanston, Ill., assignor to International Minerals & Chemical Corporation, a corporation of New York No Drawing. Application October 30, 1956
Serial No. 619,103

11 Claims. (Cl. 134—29)

This invention relates to an improved process for deenameling metal surfaces. More particularly, this invention relates to an improved process for the deenameling of metal surfaces in a caustic bath containing compounds of fluorine.

Numerous processes have been developed for the removal of enamel from surfaces of metals such as iron and steel. In general, the deenameling is accomplished by submerging the enameled ware in a hot bath of strong acid or strong caustic. When an acid bath is used, not only is the enamel removed, but also a substantial amount of the metal may be dissolved. When a hot caustic bath is used, it is possible to obtain removal of the enamel without substantial dissolution of the metal, but in order to accomplish substantially complete removal of the enamel, the ware must be submerged in the caustic bath for a prolonged period of time.

Efforts have been made to reduce the contact time required to deenamel in a caustic bath. U. S. Patent 2,584,031, issued to A. M. Lander on January 29, 1952, describes a process in which deenameling is accomplished by submerging the ware in a heated bath containing sodium hydroxide and sodium silico fluoride. The procedure described in the patent permits removal of enamel in less time than is required to deenamel in a bath containing only a sodium hydroxide solution. However, it is desirable to provide a process in which the time required to deenamel the ware is kept at a minimum, and at the same time, the bath material will not cause any significant dissolution of the metal surfaces.

It is a primary object of this invention to provide an improved process for deenameling metal surfaces. It is another object of this invention to provide a process in which the time required to deenamel metal surfaces is substantially reduced without causing any significant dissolution of the metal surfaces.

These and other objects of the instant invention will become more apparent upon a fuller understanding of the process herein described.

It has been found that when porcelain enamel ware is submerged in a heated deenameling bath which has been prepared by mixing a concentrated aqueous solution of sodium hydroxide with a fluorine-containing substance selected from the group consisting of aluminum fluoride, cryolite, a mixture of an aqueous fluosilicic acid solution and aluminum fluoride, a mixture of an aqueous fluosilicic acid solution and cryolite, a mixture of aluminum fluoride and cryolite, and a mixture of sodium fluoride and aluminum fluoride, a substantially complete deenameling can be obtained in a minimum of contact time without significant dissolution of the metal surfaces.

More in detail, an aqueous solution of sodium hydroxide is prepared having a concentration between about 50% and about 65% NaOH by weight and preferably between about 57% and about 62% NaOH by weight. This solution may be prepared by dissolving NaOH flakes or pellets in water in the conventional manner, in an iron tank of the type used in the deenameling industry. The tank is equipped with agitating means and heating means.

A fluorine-containing substance selected from the group consisting of aluminum fluoride, cryolite, a mixture of an aqueous fluosilicic acid solution and aluminum fluoride, a mixture of an aqueous fluosilicic acid solution and cryolite, a mixture of aluminum fluoride and cryolite, and a mixture of sodium fluoride and aluminum fluoride, is added to the aqueous caustic solution. It will be recognized that a mixture of sodium fluoride and aluminum fluoride having a mol ratio of sodium to aluminum of about 3:1 is the chemical equivalent of cryolite and will give substantially the same results as an equivalent amount of cryolite in the deenameling process. Other mol ratios of these two ingredients may also be used.

The fluorine-containing substance is added to the caustic solution in an amount equivalent to a weight ratio of at least about 14 parts of sodium hydroxide per part of fluorine in the fluorine-containing substance. Preferably, the bath contains between about 15 and about 25 parts by weight of NaOH per part of fluorine. When the weight ratio of NaOH to fluorine is less than about 14 to 1, an excessive amount of a gelatinous precipitate forms in the bath which substantially decreases the efficiency of the process. If the weight ratio of NaOH to F is greater than about 25 to 1, there is no substantial decrease in the time necessary for deenameling.

Best results are obtained when the fluorine-containing substance is a mixture of an aqueous solution of fluosilicic acid and aluminum fluoride or a mixture of an aqueous solution of fluosilicic acid and cryolite. Preferably between about 35% and about 60% by weight of the fluorine is added in the form of an aqueous fluosilicic acid solution, and the remainder of the fluorine is added in the form of either aluminum fluoride or cryolite as the case may be, though the sources of fluorine may be otherwise distributed and still successfully operate the process. As stated above, cryolite may be replaced with a mixture of sodium fluoride and aluminum fluoride having a Na/Al mol ratio of about 3:1.

A reduction in the time necessary to deenamel the ware in the bath may be obtained when the fluorine-containing substance is either aluminum fluoride or cryolite. However, the reduction in time is not as great as that obtained by the use of a mixture of fluosilicic acid and $AlF_3$ or a mixture of fluosilicic acid and cryolite.

The fluosilicic acid preferably is added to the caustic bath in the form of an aqueous solution having a concentration of between about 10 and about 32% $H_2SiF_6$ by weight. Cryolite, aluminum fluoride, or a mixture of sodium fluoride and aluminum fluoride may be added to the bath in solid form. Preferably, the solids have a mesh size less than about 14 mesh to permit rapid solubilization of the solids.

The temperature of the bath is maintained at an elevated superatmospheric temperature, preferably between about 140° C. and about the boiling point, and most preferably at or near the boiling point. Temperatures below 140° C. require longer contact times but may be used if desired. The bath may be agitated by suitable means. Generally the convection currents created in the bath by external heating are adequate to supply sufficient agitation.

The enameled ware is immersed in the bath until substantially all of the enamel is removed. During the deenameling process, the level of the bath is maintained at a constant level by the addition of make-up water. The rate of addition of the make-up water is substantially equal to the rate of loss of water by evaporation. The make-up water is preferably added by spraying on the surface of the bath.

After the enamel ware is submerged in the bath, a gelatinous precipitate gradually begins to form and continues to form as the deenameling process proceeds. The presence of this precipitate in the bath seriously affects the efficiency of the deenameling process and therefore should be removed. The removal of the precipitate may be accomplished by continuously removing a minor portion of the bath slurry, separating the solid from the slurry by filtration or the like, for example, in a continuous rotating disc filter, recovering the clarified bath solution and returning it to the deenameling tank. The solids removed during this step are discarded. Because of the corrosive nature of the hot slurry separated from the deenameling tank, it is necessary to use a filter cloth made of nylon or Teflon when filtration apparatus is used to separate the solids. It has been found that filter cloths made of cotton, wool, orlon, saran or polyethylene will deteriorate at a rapid rate when used as the filter medium for this type of slurry.

The time required to remove substantially all of the enamel from the ware will vary with the thickness of the enamel. Generally, enamel having a thickness on the order of 0.013 inch will be completely removed after being submerged in the bath for about 1 hour.

After the ware is substantially free of enamel, it is removed from the bath and washed with hot water. The enamel ware may be washed by immersion in a bath of hot aqueous medium, usually water or dilute aqueous mineral acid, or washed by spraying or the like until substantially free of bath solution. If desired, the wash water may be collected and if water is used, recycled to the deenameling bath as make-up water.

After washing in hot water, the metal is dried, for example, by drying in the atmosphere or by passing hot gases across the surface of the metal. After drying, the metal may be sandblasted if desired, prior to reenameling treatment.

As illustrative of the character of the instant invention but is no wise intending to be limited thereby, the following examples are described. All parts and percentages are by weight unless otherwise specified.

EXAMPLE I

An aqueous 60% sodium hydroxide solution was prepared by dissolving solid sodium hydroxide in water. Eight hundred parts of this solution were placed in an iron container. About 63.7 parts of an aqueous 30% fluosilicic acid solution and about 20 parts of solid cryolite having a mesh size of about minus 14 mesh were added to the caustic and stirred. The bath was heated at a temperature of about 160° C. A steel panel, which was coated with porcelain enamel on the two sides having the largest surface area, was placed in the hot bath solution. The thickness of each coating of enamel varied between about 0.011 and about 0.025 inch. Make-up water was added periodically to maintain a constant liquid level in the iron container. The bath solution was agitated while the enameled ware was immersed therein. About 95% of the enamel was removed from the steel surfaces after the panel was submerged in the bath for about 2 hours.

EXAMPLES II–V

The steps of Example I were repeated with the exception that the composition of the bath was changed. Table I shows the bath composition in each example.

*Table I*

| Example | Parts of 60% NaOH Solution | Parts of 30% H$_2$SiF$_6$ Solution | Parts of Na$_3$AlF$_6$ | Parts of AlF$_3$ | Parts of NaF |
|---|---|---|---|---|---|
| II | 800 | 51.0 | 25 | | |
| III | 800 | 63.7 | 30 | | |
| IV | 800 | 63.7 | | 9 | 14 |
| V | 800 | 63.7 | | 8 | |

Following are the results obtained in Examples II–V, respectively:

| Example | Time in Bath, Hours | Percent of Enamel Removed |
|---|---|---|
| II | 2 | 98 |
| III | 1.5 | 95 |
| IV | 1.5 | 95 |
| V | 1.0 | 100 |

EXAMPLES VI–VII

The steps of Example I were repeated with the exception that the composition of the bath was changed. In Example VI, the bath was comprised of about 800 parts of an aqueous 60% NaOH solution and about 38 parts of cryolite. About 85% of the enamel was removed in about 2 hours.

In Example VII, the bath was comprised of about 800 parts of an aqueous 60% NaOH solution and about 36 parts of AlF$_3$. About 75% of the enamel was removed in about 1.5 hours.

EXAMPLES VIII–X

The following comparative tests were carried out. An aqueous 60% sodium hydroxide solution was prepared by dissolving solid sodium hydroxide in water. Portions A, B, and C of the solution were each placed in a separate iron container in an amount equivalent to about 800 parts of solution in each container. In Example IX, about 37 parts of solid sodium silicofluoride were added to portion B in the manner described in U. S. Patent No. 2,584,031. In Example X, about 51 parts of aqueous 30% H$_2$SiF$_6$ solution and about 25 parts of cryolite were added to portion C. Example VIII utilized the caustic soda solution without further additives. The three iron containers were each heated to maintain the solution therein at a temperature of about 160° C. A steel panel having an enamel coating on each of two sides having the largest surface area was separated into three sections of approximately equal size. The thickness of each coating on the panel varied between about 0.011 and about 0.025 inch. One section was submerged in the solution in each of the three iron containers. Make-up water was added to each iron container when necessary to maintain a constant liquid level. Each bath solution was agitated while the enameled ware was submerged therein. The sections of enameled ware were allowed to remain in their respective containers until completely free of enamel.

The results of these tests are as follows: In Example VIII, where the bath was comprised only of an aqueous 60% sodium hydroxide solution, about 10 hours of contact were required to remove all of the enamel. In Example IX, where the bath was comprised of an aqueous 60% sodium hydroxide solution and sodium silicofluoride, as taught by Lander, U. S. Patent No. 2,584,031, about 5.5 hours of contact were required to remove all of the enamel. In Example X, where the bath was comprised of an aqueous sodium hydroxide, fluosilicic acid and cryolite medium in accordance with the instant novel process, about 2.5 hours of contact were required to remove all of the enamel. It can be seen that by following the procedure of these tests, the instant novel process provides a means of deenameling metal surfaces which is about four times as fast as using caustic alone and more than twice as fast as the process taught by the Lander patent.

Having now thus fully described and illustrated the invention, what is desired to be secured by Letters Patent is:

1. In the process of deenameling metal which comprises submerging enameled metal ware in a concentrated aqueous solution of sodium hydroxide, said solution having an elevated superatmospheric temperature, removing the metal from the solution when substantially free of enamel, and washing the metal with an aqueous medium, the improvement which comprises employing an aluminum fluoride-containing substance in said aqueous solution of sodium hydroxide, whereby the time required for deenameling is substantially shortened.

2. In the process of deenameling metal which comprises submerging enameled metal ware in a concentrated aqueous solution of sodium hydroxide, said solution having an elevated superatmospheric temperature, removing the metal from the solution when substantially free of enamel, and washing the metal with an aqueous medium, the improvement which comprises employing in said aqueous solution of sodium hydroxide an aluminum fluoride-containing substance selected from the group consisting of aluminum fluoride, cryolite, a mixture of fluosilicic acid and aluminum fluoride, a mixture of fluosilicic acid and cryolite, a mixture of aluminum fluoride and cryolite, and a mixture of sodium fluoride and aluminum fluoride, whereby the time required for deenameling is substantially shortened.

3. The process of claim 1 wherein the weight ratio of NaOH to fluorine is between about 14:1 and about 25:1 in said solution.

4. In the process of deenameling metal which comprises submerging enameled metal ware in a bath of a concentrated aqueous solution of sodium hydroxide, said bath having an elevated superatmospheric temperature, removing the metal from the bath when substantially free of enamel, and washing the metal with an aqueous medium, the improvement which comprises employing aluminum fluoride in said bath, whereby the time required for deenameling is substantially shortened.

5. In the process of claim 4, the further improvement which comprises employing cryolite in said bath containing an aqueous solution of sodium hydroxide and aluminum fluoride.

6. In the process of claim 4, the further improvement which comprises employing fluosilicic acid in said bath containing an aqueous solution of sodium hydroxide and aluminum fluoride.

7. In the process of claim 6, wherein sufficient aqueous fluosilicic acid solution is employed in said bath to provide between about 35 and about 60% by weight of the total fluorine contained in the bath, and the remainder of the fluorine is supplied as aluminum fluoride.

8. In the process of deenameling metal which comprises submerging enameled metal ware in a bath of a concentrated aqueous solution of sodium hydroxide, said bath having an elevated superatmospheric temperature, removing the metal from the bath when substantially free of enamel, and washing the metal with an aqueous medium, the improvement which comprises employing cryolite in said bath, whereby the time required for deenameling is substantially shortened.

9. In the process of claim 8, the further improvement which comprises employing fluosilicic acid in said bath containing an aqueous solution of sodium hydroxide and cryolite.

10. The process of claim 9 wherein aqueous fluosilicic acid solution is employed in said bath in a quantity sufficient to provide between about 35 and about 60% by weight of the total fluorine contained in the bath, and the remainder of the fluorine is supplied as cryolite.

11. In the process of deenameling metal which comprises submerging enameled ware in a bath containing a concentrated aqueous solution of sodium hydroxide and sodium fluoride, said bath having an elevated superatmospheric temperature, removing the metal from the bath when substantially free of enamel, and washing the metal with an aqueous medium, the improvement which comprises employing aluminum fluoride in said bath, whereby the time required for deenameling is substantially shortened.

References Cited in the file of this patent

UNITED STATES PATENTS

| | | |
|---|---|---|
| 1,892,950 | Houpt | Jan. 3, 1933 |
| 1,923,828 | Janota | Aug. 22, 1933 |
| 2,547,510 | Webster | Apr. 3, 1951 |
| 2,653,860 | Meyer | Sept. 29, 1953 |

UNITED STATES PATENT OFFICE
CERTIFICATE OF CORRECTION

Patent No. 2,870,048                        January 20, 1959

Clarence Woerther

It is hereby certified that error appears in the printed specification of the above numbered patent requiring correction and that the said Letters Patent should read as corrected below.

Column 3, line 50, for "at a temperature" read -- to a temperature --; line 74, Table 1, fifth column thereof, under the heading "Parts of $AlF_3$" for the numeral "8" read -- 18 --.

Signed and sealed this 9th day of June 1959.

(SEAL)
Attest:

KARL H. AXLINE
Attesting Officer

ROBERT C. WATSON
Commissioner of Patents